United States Patent
Fukuoka

(10) Patent No.: US 10,766,353 B2
(45) Date of Patent: Sep. 8, 2020

(54) VEHICLE FRONT PORTION STRUCTURE

(71) Applicant: TOYOTA JIDOSHA KABUSHIKI KAISHA, Toyota-shi, Aichi-ken (JP)

(72) Inventor: Takahiro Fukuoka, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 241 days.

(21) Appl. No.: 16/113,223

(22) Filed: Aug. 27, 2018

(65) Prior Publication Data
US 2019/0111774 A1   Apr. 18, 2019

(30) Foreign Application Priority Data
Oct. 12, 2017   (JP) .................................. 2017-198338

(51) Int. Cl.
| | | |
|---|---|---|
| B60K 11/04 | (2006.01) | |
| B62D 25/08 | (2006.01) | |
| B62D 21/11 | (2006.01) | |
| B62D 21/15 | (2006.01) | |
| B60R 19/34 | (2006.01) | |
| B62D 21/02 | (2006.01) | |

(52) U.S. Cl.
CPC ............. *B60K 11/04* (2013.01); *B60R 19/34* (2013.01); *B62D 21/02* (2013.01); *B62D 21/11* (2013.01); *B62D 21/155* (2013.01); *B62D 25/084* (2013.01); *B60Y 2306/01* (2013.01)

(58) Field of Classification Search
CPC ......... B60K 11/04; B60R 19/34; B62D 21/02; B62D 21/11; B62D 21/155; B62D 25/084; B60Y 2306/01
See application file for complete search history.

(56) References Cited

U.S. PATENT DOCUMENTS

| 2014/0203543 | A1* | 7/2014 | Onishi ..................... B60G 7/02 280/784 |
| 2014/0361561 | A1* | 12/2014 | Kuriyama ............ B62D 25/082 293/133 |
| 2015/0336525 | A1* | 11/2015 | Nam ....................... B60R 19/04 296/187.1 |
| 2016/0068057 | A1 | 3/2016 | Saeki |
| 2016/0318469 | A1* | 11/2016 | Matsumoto ............. B60R 19/34 |
| 2017/0113726 | A1* | 4/2017 | Matsushima ........... B60R 19/34 |
| 2017/0113727 | A1* | 4/2017 | Nakamoto .............. B60R 19/34 |
| 2017/0253272 | A1* | 9/2017 | Sekiya ................. B62D 25/085 |
| 2017/0259853 | A1* | 9/2017 | Leanza ................ B62D 21/155 |

FOREIGN PATENT DOCUMENTS

JP    6112087 B2    4/2017

\* cited by examiner

*Primary Examiner* — Bryan A Evans
(74) *Attorney, Agent, or Firm* — Oliff PLC

(57) ABSTRACT

A vehicle front portion structure that includes connecting members that each have a front side connecting portion that is disposed at a vehicle longitudinal direction front side and at which a first joined portion that is joined to a radiator support and a second joined portion that is joined to a lover member are formed, a rear side connecting portion that is disposed at a vehicle longitudinal direction rear side and at which the first joined portion and the second joined portion are formed, and an outer side cut-out portion that is cut out from a vehicle transverse direction outer side and that is formed at a position that, in the vehicle longitudinal direction, is between the second joined portions of both a front side connecting portion and a rear side connecting portion.

16 Claims, 13 Drawing Sheets

VEHICLE FRONT PORTION STRUCTURE

CROSS-REFERENCE TO RELATED APPLICATION

This application is based on and claims priority under 35 USC 119 from Japanese Patent Application No. 2017-198338 filed on Oct. 12, 2017, which is incorporated by reference herein.

BACKGROUND

Technical Field

The present disclosure relates to a vehicle front portion structure.

Related Art

Japanese Patent No. 6112087 discloses, in a vehicle front portion structure that has front side members that extend in the vehicle longitudinal direction at the vehicle transverse direction both sides of the vehicle front portion, a structure in which a radiator support that supports a radiator is disposed between the pair of front side members. Lower members, that extend in the vehicle longitudinal direction and that are structured by inner panels and outer panels being joined together at flange portions, are disposed at the vehicle lower sides of the front side members. The rigidity of the vehicle front portion is improved due to the flange portions of the lower members and the radiator support being joined directly.

In Japanese Patent No. 6112087, the rigidity of the vehicle front portion is improved due to the flange portions of the lower members and the radiator support being joined together directly. Therefore, for example, even in a case in which collision load from the vehicle front side is transmitted so as to be offset in live vehicle transverse direction with respect to the center of the vehicle, and load is transmitted in a direction that is inclined with respect to the vehicle longitudinal direction, sideways toppling of the lower member can be suppressed. However, the compression strength of the surface, at which the flange portion is provided, of the lower member is high as compared with the compression strength at the surface at which the flange portion is not provided. Therefore, there is room for further improvement from the standpoint of stabilizing the deformation mode of the lower members at the time of a front collision, including at the time of an offset collision.

SUMMARY

A vehicle front portion structure of an aspect of the present disclosure, includes: a sub-frame that structures a portion of a suspension, and that is disposed at a vehicle vertical direction lower side of front side members that extend in a vehicle longitudinal direction at both vehicle transverse direction outer sides of a vehicle front portion: lower members that extend toward a vehicle front side from a front end portion of the sub-frame; a radiator support that is disposed at a vehicle transverse direction inner side of the front side members, and that is formed in a shape of a rectangular frame in a vehicle front view; and connecting members that each have a front side connecting portion that is disposed at a vehicle longitudinal direction front side and at which a first joined portion that is joined to the radiator support and a second joined portion that is joined to the lower member are formed, a rear side connecting portion that is disposed at a vehicle longitudinal direction rear side and at which the first joined portion and the second joined portion are formed, and an outer side cut-out portion that is cut out from a vehicle transverse direction outer side and that is formed at a position that, in the vehicle longitudinal direction, is between the second joined portions of both the front side connecting portion and the rear side connecting portion.

DESCRIPTION OF EMBODIMENTS

First Embodiment

A first embodiment of a vehicle front portion structure relating to the present disclosure is described hereinafter by using FIG. 1 through FIG. 10. Note that arrow FR that is shown appropriately in the respective drawings indicates the vehicle front side, arrow UP indicates the vehicle upper side, and arrow OUT indicates a vehicle transverse direction outer side. Further, in the following description, when longitudinal, vertical and left-right directions are used without being specified, they refer to the longitudinal of the vehicle longitudinal direction, the vertical of the vehicle vertical direction, and the left and the right when facing in the advancing direction.

(Overall Structure of Vehicle Front Portion Structure)

Figure 1:
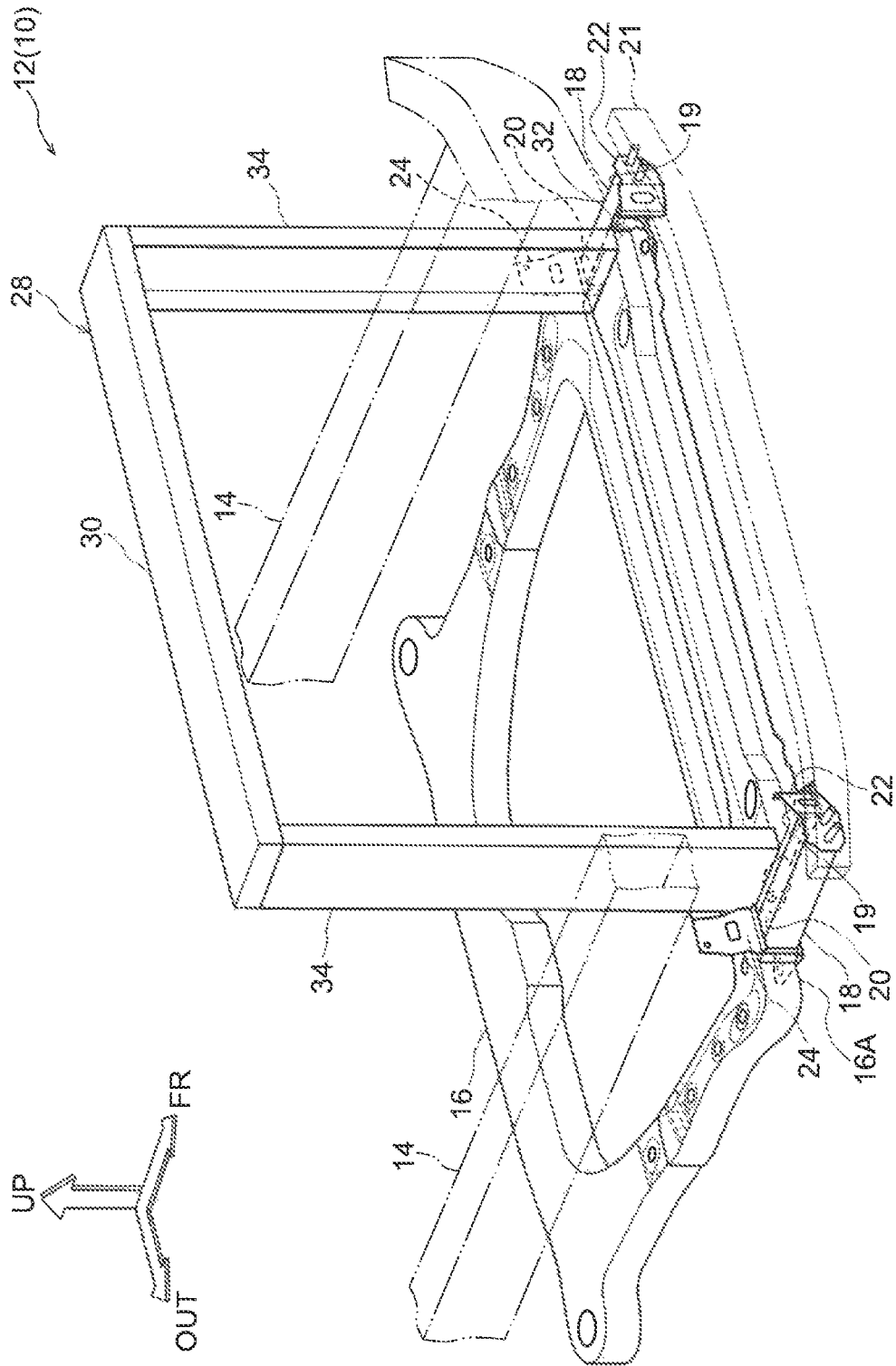
FIG. 1 is a perspective view showing a vehicle front portion structure relating to a first embodiment.
Figure 2:
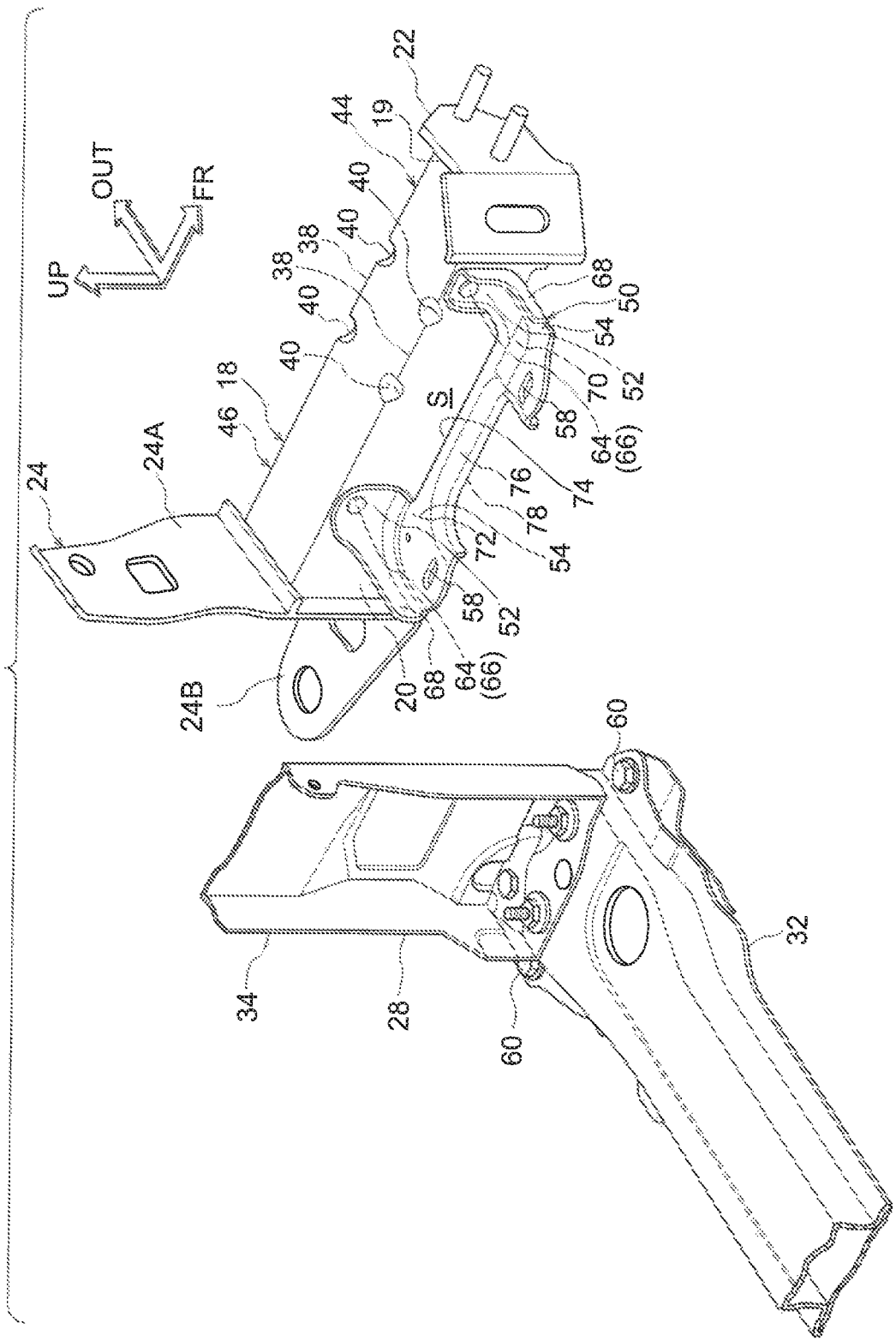
FIG. 2 is a perspective view showing a lower member, a radiator support member and a bracket relating to the first embodiment.

A pair of left and right front side members 14 that extend in the vehicle longitudinal direction are disposed at the vehicle transverse direction both outer sides of a vehicle front portion 12 of a vehicle 10 to which the vehicle front portion structure relating to the present embodiment is applied. A sub-frame 16, which is formed in the shape of a substantially rectangular flame as seen in plan view and which structures a portion of the suspension, is disposed at the vehicle vertical direction lower sides of these front side members 14. As shown in FIG. 1 and FIG. 2, a pair of left and right lower members 18 are disposed at the lower portion of the vehicle front portion 12. A radiator support 28 that supports a radiator is disposed at the vehicle transverse direction inner side of the pair of front side members 14 and the pair of lower members 18. The lower members 18 and the radiator support 28 are connected together by connecting brackets 50 that serve as connecting members. These respective structural elements are described in detail hereinafter.

(Lower Members)

Figure 3:
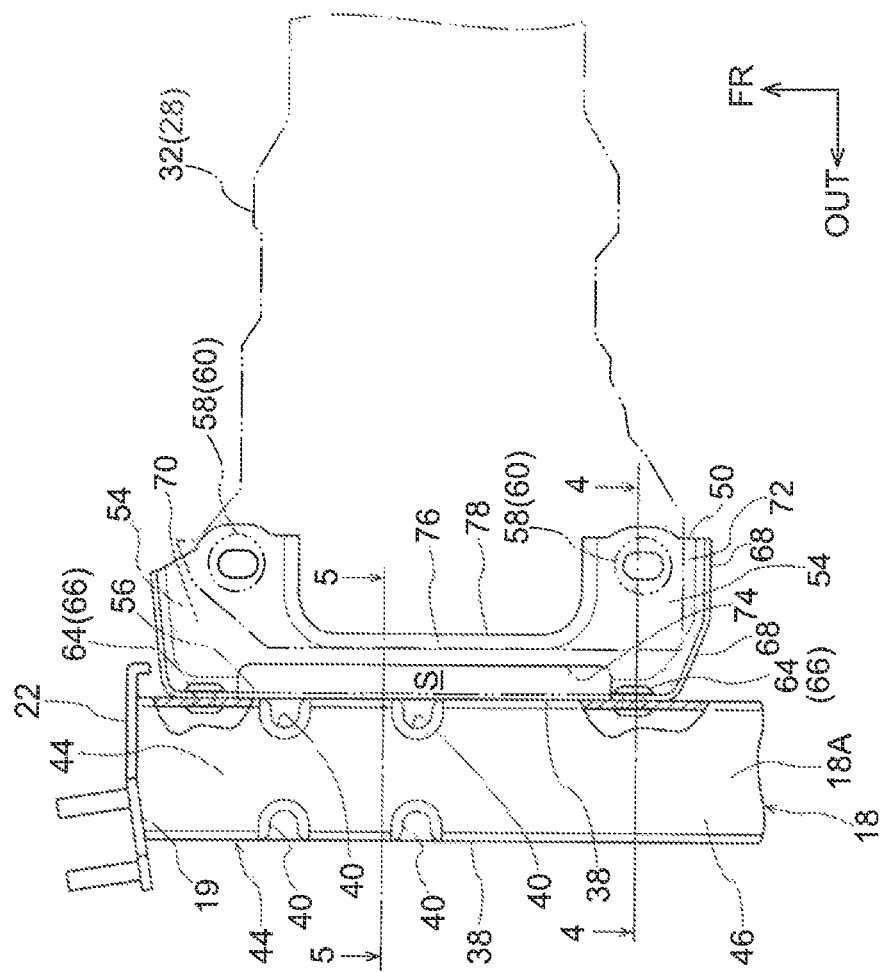
FIG. 3 is a plan view that is seen from the vehicle upper side and that shows the positional relationship between the lower member and the bracket relating to the first embodiment.
Figure 4:
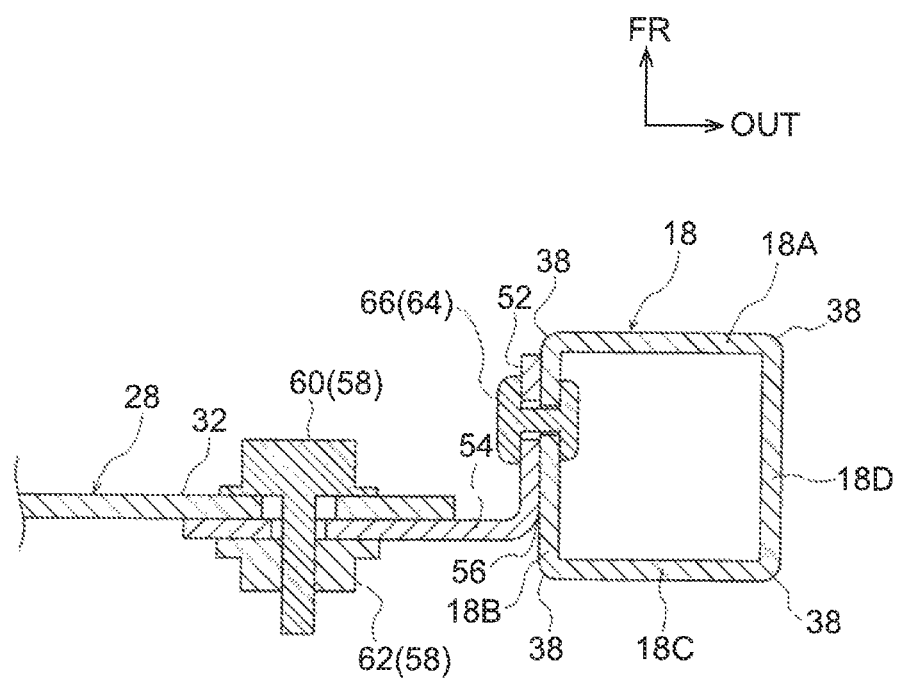
FIG. 4 is an enlarged sectional view showing, in an enlarged manner, the cross-section cut along line 4-4 of FIG. 3.
Figure 5:
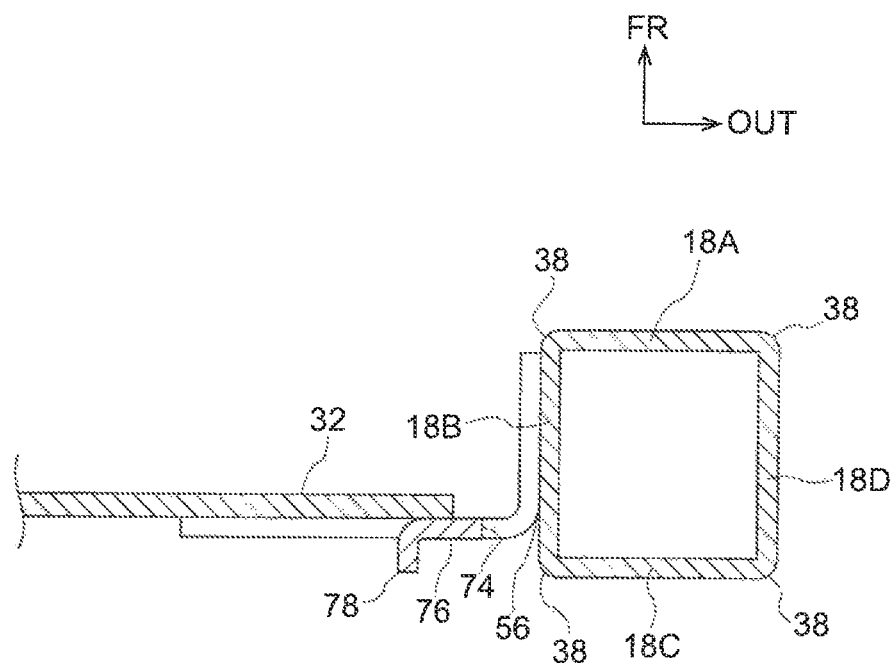
FIG. 5 is an enlarged sectional view showing, in an enlarged manner, the cross-section cut along line 5-5 of FIG. 3.

As shown in FIG. 1 through FIG. 5, the lower member 18 is an extrusion-molded part that is made of an aluminum alloy for example and whose cross-sectional shape is rectangular. The lower member 18 is formed in the shape of a hollow, rectangular pillar that extends toward the vehicle front side and extends substantially parallel to the front side member 14 toward the vehicle front side from a front end portion 16A of the sub-frame 16 and includes an upper surface 18A that faces toward the vehicle vertical direction upper side, a lower surface 18C that faces toward the vehicle vertical direction lower side, an inner side surface 18B that faces toward the vehicle transverse direction inner side, and an outer side surface 18D that faces toward the vehicle transverse direction outer side. Moreover, as shown in FIG. 4 or FIG. 5, as seen in a front view, the respective surfaces of the lower member 18 are disposed in the order of 18A, 18B, 18C, 18D, 18A, counterclockwise starting from the upper surface 18A. A total of four ridgelines 38 that extend in the vehicle longitudinal direction are formed by the surfaces of the lower member 18 that are adjacent to one another.

A weak portion 42, which is weakened due to the ridgelines 38 being cut-out by beads 40, is formed at the lower member 18, and the lower member 18 is a structure that is axially compressed easily when bearing load from the vehicle front side. The beads 40 are provided at all of the aforementioned total of four ridgelines 38. By placing more of the beads 40 further toward the front of the lower member 18 in the vehicle longitudinal direction, a region 44 that is at the vehicle longitudinal direction front side of the lower member is made to be weaker than a region 46 that is at the vehicle longitudinal direction rear side of the lower member 18. In this way, the weak portion 42 is provided at the region 44 that is at the vehicle longitudinal direction front side of the lower member 18.

Further, as shown in FIG. 1 through FIG. 3, a lower bumper reinforcement 21 (see FIG. 1, called "lower bumper RF 21" hereinafter) spans between front end portions 19 of the pair of lower members 18 (see FIG. 3). Lower bumper brackets 22 that are plate-shaped and curved as seen in plan view are joined by arc welding or the like to the front end portions 19 of the lower members 18. The lower bumper RF 21 spans between the front end portions 19 of the pair of lower members 18 as described above due to the lower bumper brackets 22 and the lower bumper RF 21 being joined by nuts and bolts.

As shown in FIG. 1 and FIG. 2, a rear end bracket 24 that is substantially L-shaped as seen in a vehicle side view is provided at a rear end portion 20 of the lower member 18. The rear end bracket 24 is structured in a substantial L-shape as seen in a vehicle side view, and includes a vertical wall portion 24A that faces the rear end portion 20 of the lower member 18 and extends in the vehicle vertical direction, and a lateral wail portion 24B that extends toward the vehicle rear side from the lower end portion of the vertical wall portion 24A. The rear end portion 20 of the lower member 18 is joined to the vertical wall portion 24A by arc welding or the like. Further, the front end portion 16A of the sub-frame 16 is supported by the lateral wall portions 24B of the rear end brackets 24. This front end portion 16A of the sub-frame 16 is connected in the vehicle vertical direction to the lower surfaces of the front side members 14 via vertical members 26 that extend in the vehicle vertical direction. Further, the upper end portions of the vertical wall portions 24A of the rear end brackets are joined to the vertical members 26 by nuts and bolts.

(Radiator Support)

The radiator support 28 is formed in a substantially rectangular frame shape as seen in a vehicle front view, and is structured to include a radiator support upper 30 that is disposed at the vehicle upper side and extends in the vehicle transverse direction, a radiator support lower 32 that extends in the vehicle transverse direction at further toward the lower side than the radiator support upper 30, and a pair of radiator support sides 34 that vertically connect the respective vehicle transverse direction left and right both end portions of the radiator support upper 30 and the radiator support lower 32 together and that structure the vehicle transverse direction both side portions of the radiator support 28.

As shown in FIG. 1, the radiator support upper 30 is a member that is elongated and extends in the vehicle transverse direction and is made of metal. The cross-sectional shape, which is cut vertically along the vehicle longitudinal direction, of the radiator support upper 30 is formed in a substantial U-shape that opens toward the vehicle lower side. Further, plural mounting holes for fixing a radiator are formed in the radiator support upper 30. The upper end portions of the pair of radiator support sides 34 are joined to the vehicle transverse direction both end portions of the radiator support upper 30. On the other hand, the radiator support lower 32 is a member that is elongated and is made of metal and is disposed substantially parallel to the radiator support upper 30. The radiator support lower 32 is a closed cross-sectional structure whose cross-sectional shape cut vertically along the vehicle longitudinal direction is substantially rectangular. The lower end portions of the pair of radiator support sides 34 are joined to the vehicle transverse direction both end portions of the radiator support lower 32.

The pair of radiator support sides 34 are both elongated members that are made of metal, and the cross-sectional shapes thereof, which are cut along the vehicle transverse direction, are formed in substantial U-shapes that open toward the vehicle transverse direction inner side. Further, the front side members 14 are joined via a pair of side brackets 36 to the vehicle transverse direction outer sides of the pair of radiator support sides 34 at the vehicle vertical direction central portions thereof.

(Connecting Brackets)

As shown in FIG. 2 through FIG. 5, the connecting bracket 50, which serves as a connecting member and connects the lower member 18 and the radiator support 28 in the vehicle transverse direction, is disposed at the vehicle transverse direction inner side of the lower member 18. The connecting bracket 50 is formed by press-molding a steel material for example, and has a side wall portion 52 that extends in the vehicle vertical direction and the vehicle longitudinal direction, and a lower wall portion 54 that extends in the vehicle transverse direction and the vehicle longitudinal direction and that, together with the side wall portion 52, forms a ridgeline 56. As shown in FIG. 4, the connecting bracket 50 has an L-shaped cross-sectional shape as seen in a vehicle front view. At first joined portions 58 that are portions joined with the radiator support 28, the lower wall portion 54 is joined to the vehicle transverse direction outer end portion of the radiator support lower 32 by bolts 60 and nuts 62. At second joined portions 64 that are portions joined with the lower member 18, the side wall portion 52 is joined to the inner side surface 18B of the lower member 18 by rivets 66. Further, lateral wall portions 68, which extend in the vehicle transverse direction and the vehicle vertical direction and connect the side wall portion 52 and the lower wall portion 54, are provided at the front end portion and the rear end portion in the vehicle longitudinal direction of the connecting bracket 50.

Comparing the diameter of the shaft of the bolt 60 and the diameter of the shaft of the rivet 66, the diameter of the shaft of the bolt 60 is slightly larger. Further, the material of the bolt 60 is a steel material for example, and the material of the rivet 66 is an aluminum alloy for example. The joining strength of the first joined portion 58 is greater than the joining strength of the second joined portion 64. Further, the strength is improved by tempering the bolt 60.

(Front Side Connecting Portion and Rear Side Connecting Portion)

As shown in FIG. 2 and FIG. 3, the first joined portion 58 and the second joined portion 64 are provided at each of the front and the rear of the connecting member. Namely, the connecting bracket 50 has a front side connecting portion 70, at which one of each of the first joined portion 58 and the second joined portion 64 are formed and which is disposed at the vehicle longitudinal direction front side, and a rear side connecting portion 72, at which one of each of the first joined portion 58 and the second joined portion 64 are similarly formed and which is disposed at the vehicle longitudinal direction rear side. As shown in FIG. 3, in the present embodiment, the position of the first joined portions 58 in the vehicle longitudinal direction, and the positions of the second joined portions 64 in the vehicle longitudinal direction, coincide. Note that the positions in the vehicle longitudinal direction coinciding is not limited to the positions of the axial centers of the bolts 60 in the vehicle longitudinal direction, and the positions of the axial centers of the rivets 66 in the vehicle longitudinal direction, coinciding exactly, and may be of an extent such that the positions of the outer shapes of the bolts 60 and the outer shapes of the rivets 66 in the vehicle longitudinal direction overlap partially.

Further, the above-described weak portion 42 of the lower member 18 is provided at a position that is, in the vehicle longitudinal direction, between the position where the front side connecting portion 70 of the connecting bracket 50 is joined to the lower member 18 and the position where the rear side connecting portion 72 is joined to the lower member 18. Namely, the weak portion 42 is provided at a position that is, in the vehicle longitudinal direction, between the positions where the lower member 18 is joined to the connecting bracket 50 at the two places that are the second joined portion 64 of the front side connecting portion 70 and the second joined portion 64 of the rear side connecting portion 72.

(Outer Side Cut-Out Portion)

As shown in FIG. 2 and FIG. 3, the connecting bracket 50 has an outer side cut-out portion 74 that is formed between the first joined portions 58 of both the front side connecting portion 70 and the rear side connecting portion 72 and that is provided such that the vehicle transverse direction outer side of the connecting bracket 50 is cut-out. Namely, the first joined portion 58 of the front side connecting portion 70 is provided at the vehicle longitudinal direction front side of the outer side cut-out portion 74, and the first joined portion 58 of the rear side connecting portion 72 is provided at the vehicle longitudinal direction rear side of the outer side cut out portion 74. As shown in FIG. 3, the outer side cut-out portion 74 is formed, as seen in plan view, in a substantially rectangular shape whose length direction is the vehicle longitudinal direction.

As shown in FIG. 2 and FIG. 3, a uniting portion 76 that unites the front side connecting portion 70 and the rear side connecting portion 72 in the vehicle longitudinal direction us provided at the connecting bracket 50. At the connecting bracket 50, the dimension of the uniting portion 76 in the vehicle transverse direction or the vehicle vertical direction is, due to the provision of the outer side cut-out portion 74, formed to be smaller than those of the front side connecting portion 70 and the rear side connecting portion 72. Further, at a position that is between the second joined portions 64 of both the front side connecting portion 70 and the rear side connecting portion 72, the outer side cut-out portion 74 is formed from the upper end to the lower end of the side wall portion 52 over the vehicle vertical direction, and further, is bent-back in the vehicle transverse direction and is formed so as to extend to the outer end of the lower wall portion 54. Namely, as shown in FIG. 3, the ridgeline 56 that is formed by the side wall portion 52 and the lower wall portion 54 is cut-out at the vehicle longitudinal direction central portion of the connecting bracket 50.

(Inner Side Cut-Out Portion)

As shown in FIG. 2 and FIG. 3, the connecting bracket 50 has an inner side cut-out portion 78 that is formed at a position that, in the vehicle longitudinal direction, is between the first joined portions 58 of both the front side connecting portion 70 and the rear side connecting portion 72, and that is formed by the vehicle transverse direction inner side of the lower wall portion 54 being cut-out. As shown in FIG. 3 and FIG. 5, the inner side cut-out portion 78 is structured due to the vehicle transverse direction inner side of the lower wall portion 54 being cut-out at the vehicle longitudinal direction central portion of the connecting bracket 50. At the connecting bracket 50, the vehicle transverse direction dimension of the above-described uniting portion 76 is aimed to be smaller than those of the front side connecting portion 70 and the rear side connecting portion 72, due to the provision of the inner side cut-out portion 78.

(Operation and Effects)

Operation and effects of the vehicle front portion structure of the present embodiment are described next.

Figure 6:
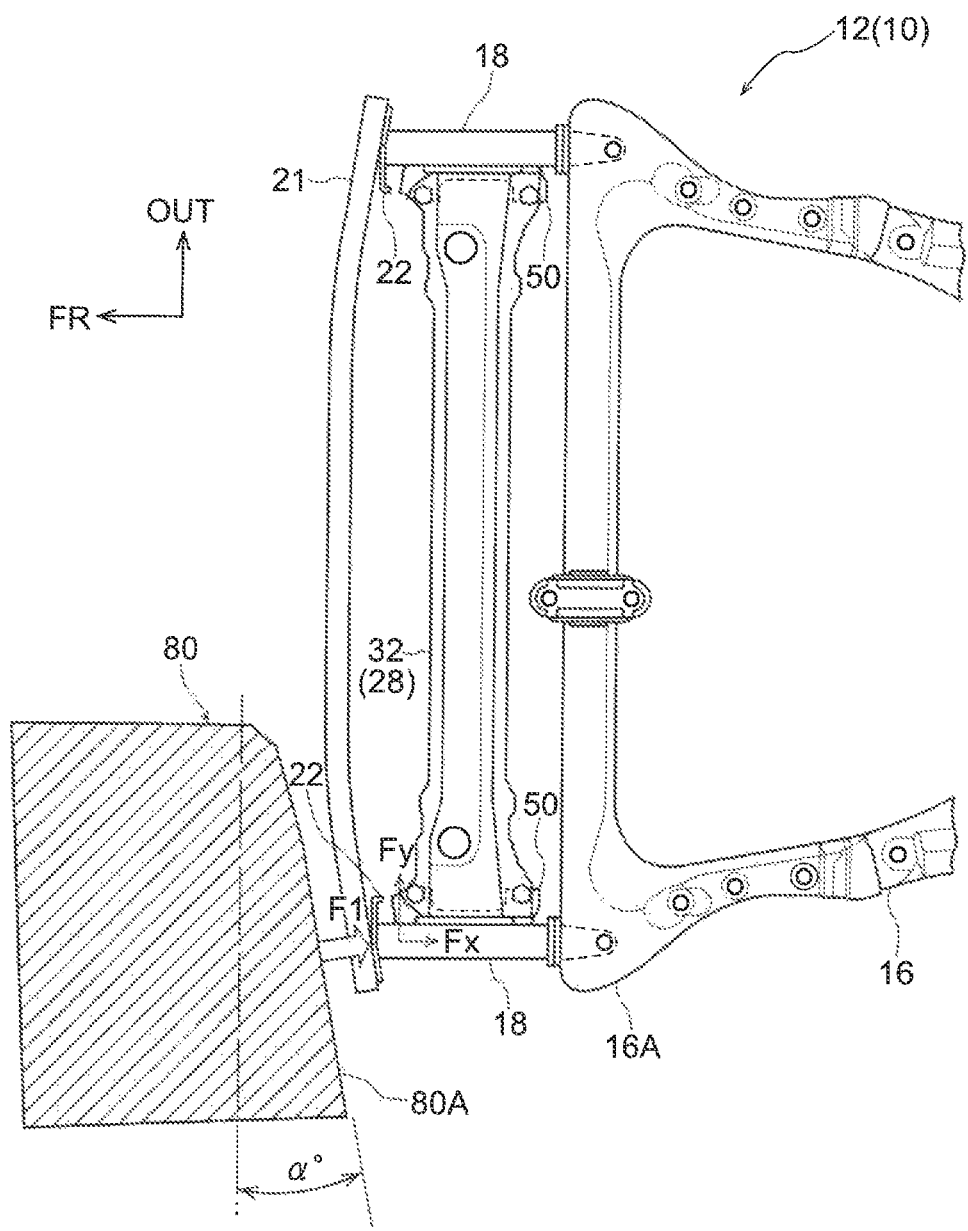
FIG. 6 is a schematic drawing showing an offset collision of a vehicle to which the vehicle front portion structure relating to the first embodiment is applied.
Figure 7:
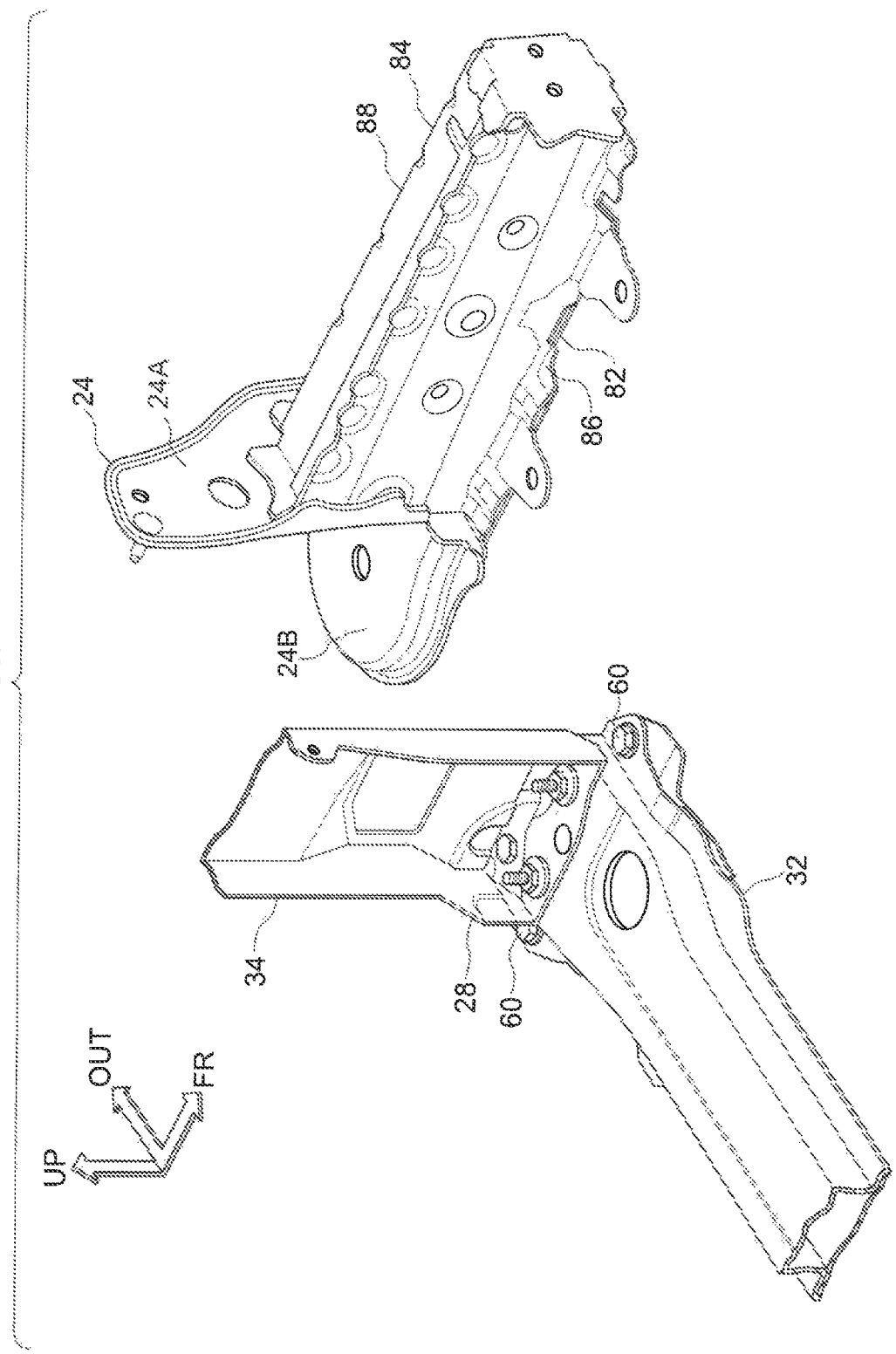
FIG. 7 is a perspective view showing a lower member and a radiator support member of a comparative example.
Figure 8:
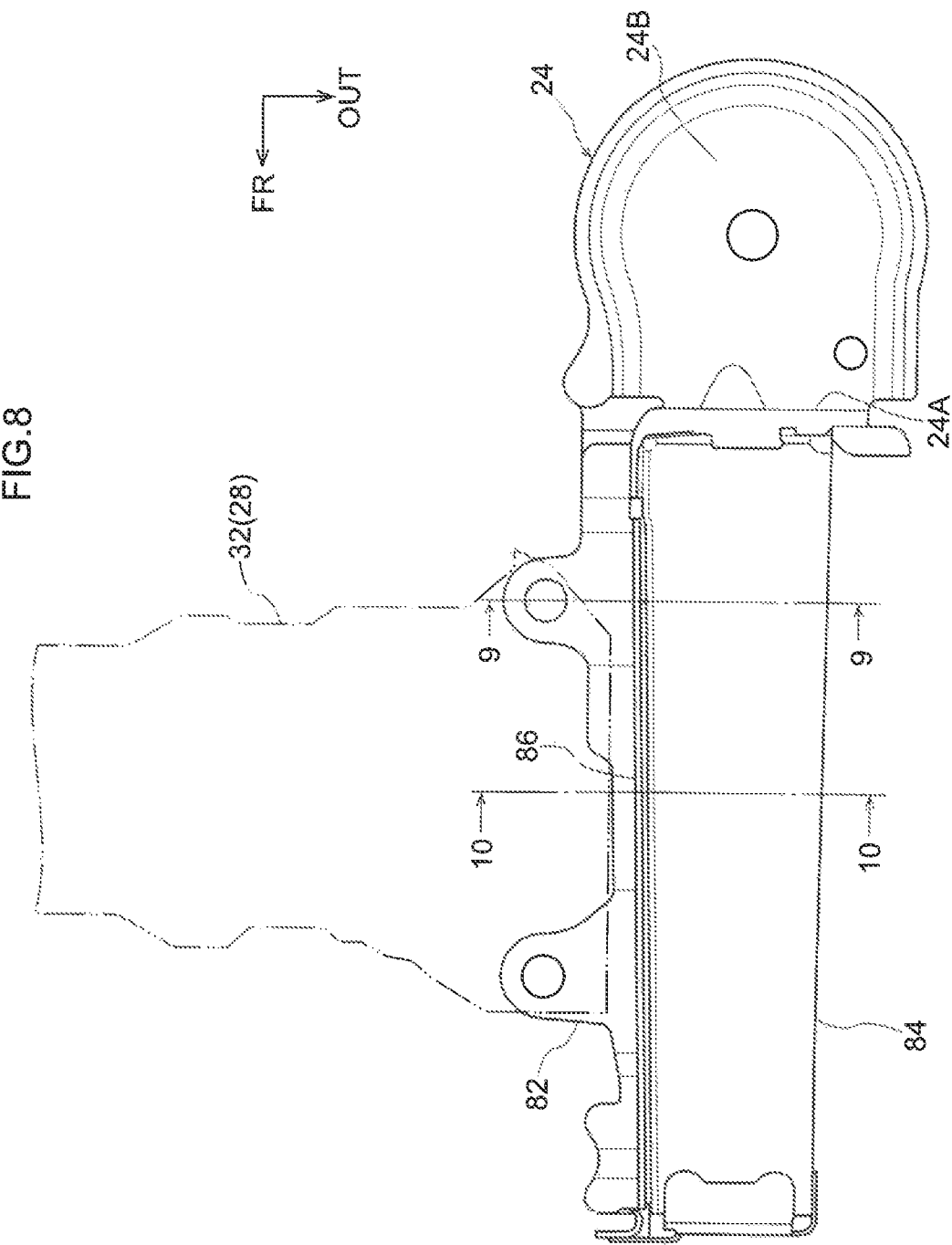
FIG. 8 is a plan view that is seen from the vehicle upper side and that shows the lower member of the comparative example.
Figure 9:
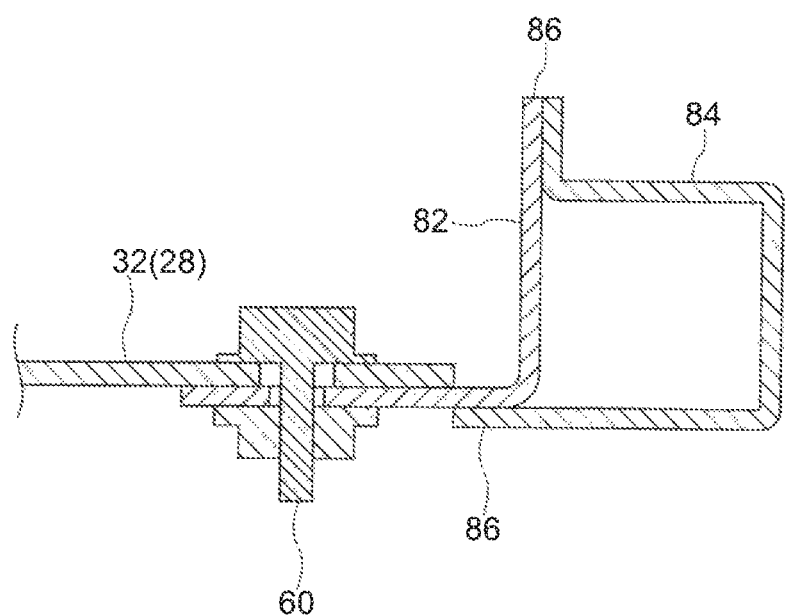
FIG. 9 is an enlarged sectional view showing, in an enlarged manner, the cross-section cut along line 9-9 of FIG. 8.
Figure 10:
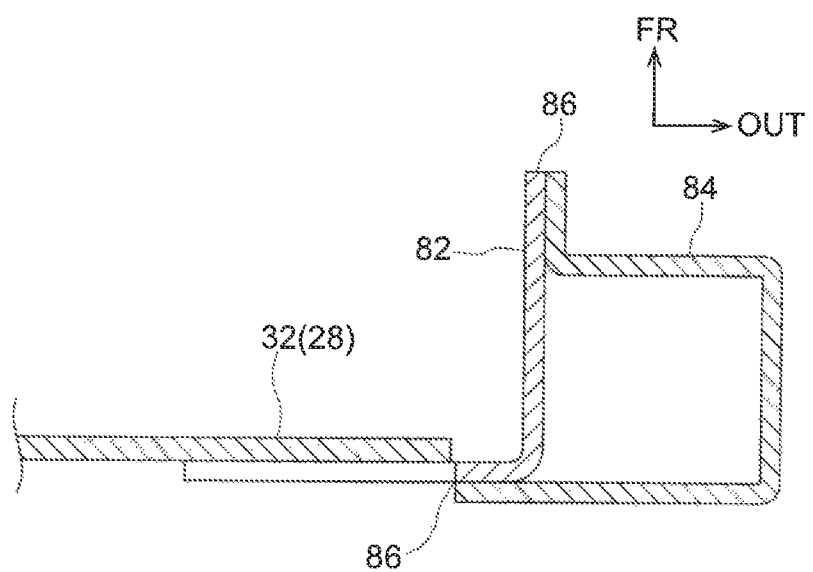
FIG. 10 is an enlarged sectional view showing, in an enlarged manner, the cross-section cut along line 10-10 of FIG. 8.

As shown in FIG. 6, when the vehicle 10, which is provided with the vehicle front portion structure relating to the present embodiment, collides with a barrier 80 while offset in the vehicle transverse direction with respect to the vehicle center, at the vehicle lower portion, collision load from the vehicle from side is transmitted via the lower bumper RF 21 mainly to the one lower member 18 that is at the barrier 80 side. At this time, there are cases in which load is transmitted from the vehicle front side to the lower member 18 in a direction that is inclined with respect to the vehicle longitudinal direction. For example, if a front surface 80A of the barrier 80 is inclined $\alpha°$ with respect to the vehicle transverse direction as shown in FIG. 6, load F1 from the vehicle front side is applied from the barrier 80 to the vehicle at an incline, toward the vehicle transverse direction inner side, of $\alpha°$ with respect to the vehicle longitudinal direction.

As shown in FIG. 3 and FIG. 6, in the present embodiment, the lower member 18 and the radiator support 28 are connected by the connecting bracket 50 via the first joined portions 58 and the second joined portions 64 of the connecting bracket 50. Therefore, load Fy toward the vehicle transverse direction inner side can be transmitted from the lower member 18 via the connecting bracket 50 to the radiator support 28. At this time, reaction force is obtained from the radiator support 28, and displacement of the lower member 18 in the vehicle transverse direction is restricted. Therefore, sideways toppling of the lower member 18 can be suppressed.

Further, when, of the load F1 from the vehicle front side, load Fx that is the component of force toward the vehicle longitudinal direction rear side is transmitted from the lower member 18 to the sub-frame 16, reaction force from the sub-frame 16 is obtained, and load in the axial compression direction is applied to the lower member 18. At this time, a space S that extends in the vehicle longitudinal direction is formed at the vehicle transverse direction inner side of the lower member 18 due to the outer side cut-out portion 74 being provided at a position that is, in the vehicle longitudinal direction, between the second joined portions 64 of both the front side connecting portion 70 and the rear side connecting portion 72 of the connecting bracket 50. Therefore, the strength of the connecting bracket 50 with respect to the load Fx in the vehicle longitudinal direction, at the position between the second joined portions 64 of both the front side connecting portion 70 and the rear side connecting portion 72, can be lowered, and the lower member 18 being reinforced by the connecting bracket 50 at the vehicle transverse direction inner side of the lower member 18 can be suppressed. Accordingly, the lower member 18 can be axially compressed stably, and the deformation mode of the lower member 18 is stable. Further, the effect that the lower member 18 can be axially compressed stably by suppressing the above-described reinforcing of the lower member 18 by the connecting bracket 50 at the vehicle transverse direction inner side of the lower member 18, is not limited to at the time of an offset collision such as described above, and can be expected also at the time of a front collision for example.

Moreover, in the present embodiment, the joining strength of the second joined portions 64 of the connecting bracket 50 that are joined to the lower member 18 is set to be lower than the joining strength of the first joined portions 58 that are joined to the radiator support 28. Therefore, when the collision progresses, and the lower member 18 starts to be axially compressed, and the amount of deformation (the amount of compression) of the lower member 18 becomes greater than that of the radiator support 28, it is easy for the joining of the lower member 18 and the connecting bracket 50 to be cancelled. Due thereto, reinforcing of the lower member 18 by the connecting bracket 50 at the vehicle transverse direction inner side of the lower member 18 is suppressed, and the lower member 18 can be axially compressed stably. Accordingly, the deformation mode of the lower member 18 is stable.

Further, in the present embodiment, as shown in FIG. 2, the positions, in the vehicle longitudinal direction of the second joined portions 64 of the connecting bracket 50 that are joined to the lower member 18, and the positions in the vehicle longitudinal direction of the first joined portions 58, coincide. Therefore, torsional load arising at the connecting bracket 50 with respect to the load Fy in the vehicle transverse direction at the time of the above-described offset collision can be suppressed. Accordingly, the strength of the connecting bracket 50 with respect to the load Fy in the vehicle transverse direction is increased, and load is effectively transmitted from the lower member 18 to the radiator support 28, and due to reaction force being obtained from the radiator support 28, sideways toppling of the lower member 18 can be suppressed.

In the present embodiment, as shown in FIG. 2 and FIG. 3, the first joined portions 58 of the connecting bracket 50 connect the lower member 18 and the radiator support lower 32, and, at the time of an offset collision of the vehicle 10, the load Fy in the vehicle transverse direction can be transmitted from the lower member 18 via the connecting bracket 50 to the radiator support lower 32. Namely, the load Fy can be transmitted in the compression direction with respect to the extending direction of the radiator support lower 32, and reaction force can be obtained effectively from the radiator support lower 32. Accordingly, sideways toppling of the lower member 18 can be suppressed.

Further, in the present embodiment, as shown in FIG. 2 through FIG. 5, the connecting bracket 50 has the side wall portion 52 at which the second joined portions 64 are formed, and the lower wall portion 54 at which the first joined portions 58 are formed and that, together with the side wall portion 52, forms the ridgeline 56 that contacts the lower member 18. Due to the connecting bracket 50 having the side wall portion 52 and the lower wall portion 54 that, together with the side wall portion 52, forms the ridgeline 56 that contacts the lower member 18, the load Fy in the vehicle transverse direction can be effectively transmitted from the lower member 18 to the radiator support 28 via the side wall portion 52, the ridgeline 56 and the lower wall portion 54 of the connecting bracket 50, and sideways toppling of the lower member 18 can be suppressed.

Moreover, in the present embodiment, due to the connecting bracket 50 having the lateral wall portions 68 that connect the side wall portion 52 and the lower wall portion 54 as shown in FIG. 2 and FIG. 3, the rigidity of the connecting bracket 50 with respect to the load Fy in the vehicle transverse direction can be increased. Accordingly, the load Fy in the vehicle transverse direction can be effectively transmitted from the lower member 18 to the radiator support 28 via the side wall portion 52, the lateral wall portions 68 and the lower wall portion 54 of the connecting bracket 50, and sideways toppling of the lower member 18 can be suppressed.

Further, in the present embodiment, as shown in FIG. 2 and FIG. 3, there is provided the uniting portion 76 whose dimension in the vehicle transverse direction or the vehicle vertical direction is formed to be smaller than those of the front side connecting portion 70 and the rear side connecting portion 72, and that unites the front side connecting portion 70 and the rear side connecting portion 72 in the vehicle longitudinal direction. In the process of joining the connecting bracket 50 to the lower member 18, rotation of the front side connecting portion 70 and the rear side connecting portion 72 can be suppressed. Accordingly, the accuracy of mounting the connecting bracket 50 to the lower member 18 can be improved. Further, because the dimension of the uniting portion 76 in the vehicle transverse direction or the vehicle vertical direction is formed to be smaller than those of the front side connecting portion 70 and the rear side connecting portion 72, the strength of the connecting bracket 50 decreases at the uniting portion 76, and the lower member 18 being reinforced by the connecting bracket 50 at the vehicle transverse direction inner side of the lower member 18 can be suppressed. Accordingly, at the time of a front collision of the vehicle, the lower member 18 can be axially compressed stably, and the deformation mode of the lower member 18 is stable.

Moreover, in the present embodiment, as shown in FIG. 3, the outer side cutout portion 74 is formed at a position that is between the second joined portions 64 of both the front side connecting portion 70 and the rear side connecting portion 72, from the upper end to the lower end of the side wall portion 52 over the vehicle vertical direction, and further, is bent-back in the vehicle transverse direction and is formed so as to extend to the outer end of the lower wall portion 54. Due thereto, the strength of the vehicle longitudinal direction central portion of the connecting bracket 50 is lowered, and therefore, the lower member 18 being reinforced by the connecting bracket 50 at the vehicle transverse direction inner side of the lower member 18 can be suppressed. Further, in the present embodiment, because the uniting portion 76 of the connecting bracket 50 is offset in the vehicle transverse direction with respect to the second joined portions 64, it is easy for the uniting portion 76 to buckle and deform at the time of a front collision.

In the present embodiment, the inner side cut-out portion 78, which is formed at a position that is, in the vehicle longitudinal direction, between the first joined portions 58 of both the front side connecting portion 70 and the rear side connecting portion 72, and that is formed by the vehicle transverse direction inner side of the lower wall portion 54 being cut-out, is formed in the connecting bracket 50. Due thereto, the strength of the vehicle longitudinal direction central portion of the connecting bracket 50 is decreased, and therefore, the lower member 18 being reinforced by the connecting bracket 50 at the vehicle transverse direction inner side of the lower member 18 can be suppressed.

Moreover, in the present embodiment, as shown in FIG. 2 through FIG. 5, the lower member 18 is extrusion molded such that the cross-section thereof orthogonal to the extending direction is a closed cross-sectional shape. Therefore, as compared with a case in which, for example, a lower member 88 is structured due to an inner panel 82 and an outer panel 84 being joined at flange portions 86 that extend in the vehicle longitudinal direction as shown in FIG. 6 through FIG. 10, the lower member 18 can be axially compressed stably at the time of a front collision of the vehicle. Accordingly, the deformation mode of the lower member 18 is stable.

Further, in the present embodiment, as shown in FIG. 2 and FIG. 3, the weak portion 42 of the lower member 18 is provided at a position that is, in the vehicle longitudinal direction, between the position at which the front side connecting portion 70 is joined to the lower member 18 and the position at which the rear side connecting portion 72 is joined to the lower member 18. Therefore, as compared with a case in which, for example, the weak portion 42 is provided at the position of the second joined portion of the front side connecting portion in the vehicle longitudinal direction, at the time of an offset collision of the vehicle, load can be transmitted stably from the lower member to the radiator support 28 via the connecting bracket 50. Further, the weak portion 42 is provided at the region 44 that is at the vehicle longitudinal direction front side of the lower member 18, and the strength of the region 46 that is at the rear side of the lower member 18 is relatively high as compared with that of the region 44 that is at the front side. Due thereto, sideways toppling of the lower member 18 at the time of an offset collision can be suppressed. Note that, at the time when the lower member 18 is axially compressed, there is a deformation mode in which the lower member 18 is axially compressed first in the form of bellows from the region 44 that is at the front side, and then, the region 46 that is at the rear side is axially compressed.

Second Embodiment

Figure 11:
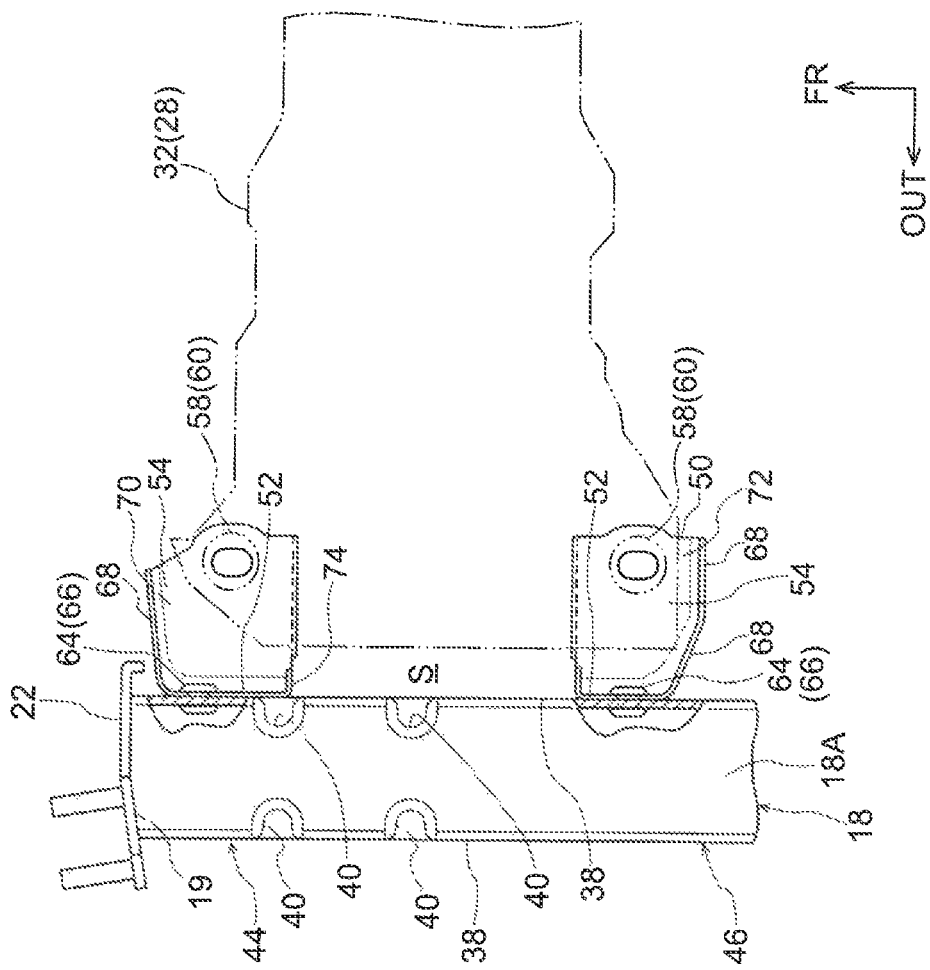
FIG. 11 is a plan view that is seen from the vehicle upper side and that shows the positional relationship between a lower member and a bracket relating to a second embodiment.

A second embodiment of the vehicle front portion structure relating to the present disclosure is described next by using FIG. 11. Note that structural portions that are the same as those of the above-described first embodiment are denoted by the same reference numerals, and description thereof is omitted. In the vehicle front portion structure of the present embodiment, the front side connecting portion 70 and the rear side connecting portion 72 are separate members that are apart in the vehicle longitudinal direction by the outer side cut-out portion 74. Namely, in the present embodiment, the outer side cut-out portion 74 can be considered as being formed at a position that is between the second joined portions 64 of both the front side connecting portion 70 and the rear side connecting portion 72, from the upper end to the lower end of the side wall portion 52 over the vehicle vertical direction, and, further, being bent-back in the vehicle transverse direction and extending to the inner end edge of the lower wall portion 54. Namely, due to the outer side cut-out portion 74, the space S that extends in the vehicle longitudinal direction is formed at a position between the front side connecting portion 70 and the rear side connecting portion 72, at the vehicle transverse direction inner side of the lower member 18. In the present embodiment, a uniting portion that unites the front side connecting portion 70 and the rear side connecting portion 72 in the vehicle longitudinal direction is not provided.

In the present embodiment, because the front side connecting portion 70 and the rear side connecting portion 72 are separate members that are apart in the vehicle longitudinal direction by the outer side cut-out portion 74, direct load transmission being carried out between the front side connecting portion 70 and the rear side connecting portion 72 can be suppressed. Accordingly, at the time of a front collision of the vehicle 10, the lower member 18 can be axially compressed stably, and the deformation mode of the lower member 18 is stable.

Third Embodiment

Figure 12:
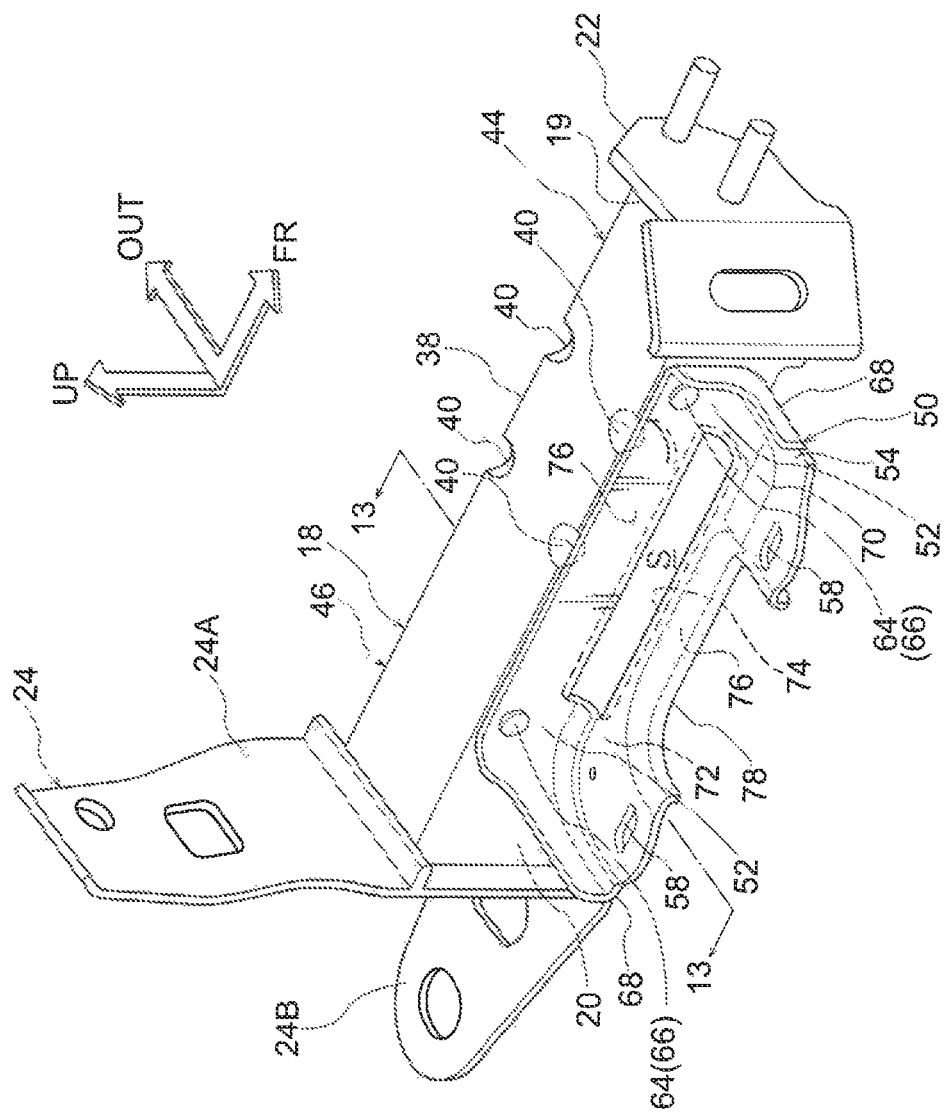
FIG. 12 is a plan view that is seen from the vehicle upper side and that shows the positional relationship between a lower member and a bracket relating to a third embodiment.
Figure 13:
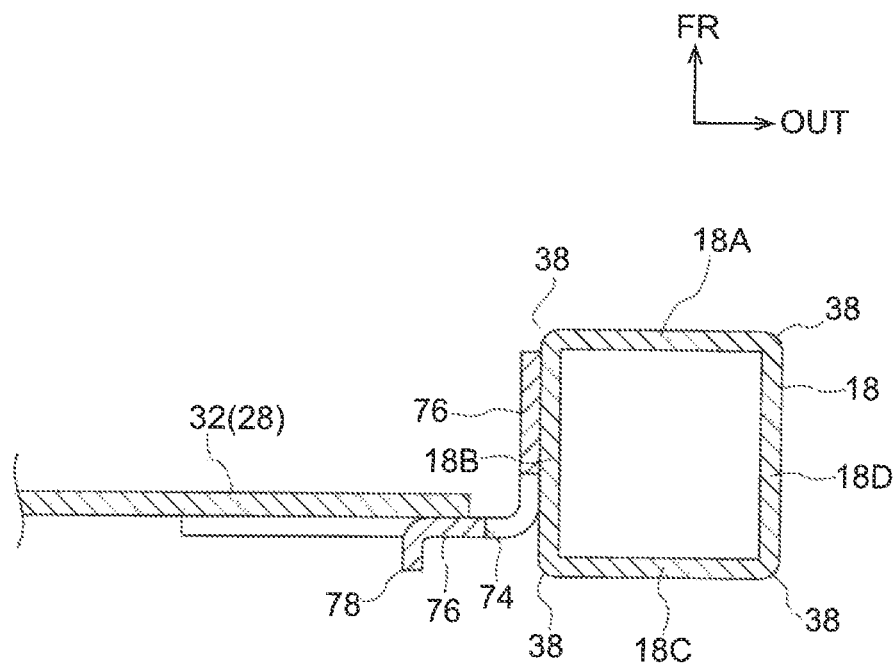
FIG. 13 is an enlarged sectional view showing, in an enlarged manner, the cross-section cut along line 13-13 of FIG. 12.

A third embodiment of the vehicle front portion structure relating to the present disclosure is described next by using FIG. 12 and FIG. 13. In the vehicle front portion structure of the present embodiment, the outer side cut-out portion 74 is formed by cutting-out only the ridgeline 56 and the vicinity thereof. Namely, the outer side cut-out portion 74 is formed at a position between the second joined portions 64 of both the front side connecting portion 70 and the rear side connecting portion 72, at the ridgeline 56 from the lower end portion of the side wall portion 52, and further, is bent-back in the vehicle transverse direction and is formed so as to extend to the outer end portion of the lower wall portion 54. In the present embodiment as well, due to the outer side cut-out portion 74, the space S that extends in the vehicle longitudinal direction is formed at a position that is between the front side connecting portion 70 and the rear side connecting portion 72 and that is at the vehicle transverse direction inner side of the lower member 18. Further, as shown in FIG. 12 and FIG. 13, the inner side cut-out portion 78 is formed due to the vehicle transverse direction inner side of the lower wall portion 54 being cut-out at the vehicle longitudinal direction central portion of the connecting bracket 50.

Due to portions of the side wall portion 52 and the lower wall portion 54, and the ridgeline 56, of the connecting bracket 50 being cut-out by the outer side cut-out portion 74, the strength of the vehicle longitudinal direction central portion of the connecting bracket 50 is lowered. Therefore, the lower member 18 being reinforced by the connecting bracket 50 at the vehicle transverse direction inner side of the lower member 18 can be suppressed. Accordingly, at the time of a front collision of the vehicle 10, the lower member 18 can be axially compressively deformed stably, and the deformation mode of the lower member 18 is stable.

Supplement to Embodiments

Note that the present disclosure is not limited to the above-described embodiments.

For example, in the above-described embodiments, the positions of the second joined portions 64 in the vehicle longitudinal direction, and the positions of the first joined portions 58 in the vehicle longitudinal direction, coincide, but the present disclosure is not limited to this. For example, the positions of the second joined portions 64 in the vehicle longitudinal direction may be formed so as to be further toward the front in the vehicle longitudinal direction, or further toward the rear in the vehicle longitudinal direction, than the positions of the first joined portions 58 in the vehicle longitudinal direction.

Further, although the first joined portions 58 of the connecting bracket 50 connect the lower member 18 and the radiator support lower 32 in the above-described embodiments, the present disclosure is not limited to this. For example, the first joined portions 58 of the connecting bracket 50 may connect the lower member 18 and the radiator support side 34.

In the above-described embodiments, the connecting bracket 50 has the side wall portion 52 at which the second joined portions 64 are formed and that extends in the vehicle vertical direction and the vehicle longitudinal direction, and the lower wall portion 54 at which the first joined portions 58 are formed and that extends in the vehicle transverse direction and the vehicle longitudinal direction. However, the present disclosure is not limited to this. For example, the connecting bracket 50 does not have to have the side wall portion 52, and the first joined portions 58 and the second joined portions 64 may be formed at the lower wall portion 54. In this case, it suffices for the connecting bracket 50 to be disposed so as to connect the radiator support lower 32 and the lower surface 18C of the lower member 18.

Further, in the above-described embodiments, the connecting bracket 50 has the lateral wall portions 68 that connect the side wall portion 52 and the lower wall portion 54, but the present disclosure is not limited to this, and the lateral wall portions 68 do not have to be provided.

A portion of the ridgeline 56, which is formed by the side wall portion 52 and the lower wall portion 54, is cut-out by the outer side cut-out portion 74 of the connecting bracket 50 in the above-described embodiments. However, the present disclosure is not limited to this, and, for example, only the side wall portion 52 may be cut-out, without the ridgeline 56 being cut-out by the outer side cut-out portion 74.

Further, in the above-described embodiments, the connecting bracket 50 has the inner side cut-out portion 78 at which the vehicle transverse direction inner side of the lower wall portion 54 is cut-out. However, the present disclosure is not limited to this, and the inner side cut-out portion 78 does not have to be provided.

Further, in the above-described embodiments, the lower member 18 is an extrusion molded part that is made of an aluminum alloy and whose cross-section orthogonal to the extending direction is a closed cross-sectional shape. However, the present disclosure is not limited to this, and the lower member 18 may be formed of resin or formed of steel. Or, the lower member 18 may be a cast product.

Further, in the above-described embodiments, the weak portion 42 of the lower member 18 is formed by the ridgelines 38 of the lower member 18 being cut-out by the beads 40. However, the present disclosure is not limited to this, and, for example, the weak portion 42 does not have to be formed. Further, in the above-described embodiments, the weak portion 42 is provided at a position that, in the vehicle longitudinal direction, is between the position at which the front side connecting portion 70 is joined and the position at which the rear side connecting portion 72 is joined. However, the present disclosure is not limited to this. For example, the weak portion 42 may be provided at a position that is further toward the front, in the vehicle longitudinal direction, than the position at which the front side connecting portion 70 is joined to the lower member 18.

Further, in the above-described embodiments, for example, the weak portion 42 of the lower member 18 is provided at the region that is at the vehicle longitudinal direction front side of the lower member 18. However, the present disclosure is not limited to this. For example, the weak portion 42 may also be provided at the region that is at the vehicle longitudinal direction rear side.

Although vehicle front portion structures relating to first through third embodiments of the present invention have been described above, the present invention can be embodied in various forms within a scope that does not depart from the gist of the present disclosure.

An object of the present disclosure is to provide a vehicle front portion structure that can achieve both suppression of sideways toppling of a lower member at the time of an offset collision, and stabilization of the deformation mode of the lower members at the time of a front collision.

A vehicle front portion structure of a first aspect, includes: a sub-frame that structures a portion of a suspension, and that is disposed at a vehicle vertical direction lower side of front side members that extend in a vehicle longitudinal direction at both vehicle transverse direction outer sides of a vehicle front portion; lower members that extend toward a vehicle from side from a from end portion of the sub-frame; a radiator support that is disposed at a vehicle transverse direction inner side of the front side members, and that is formed in a shape of a rectangular frame in a vehicle front view; and connecting members that each have a front side connecting portion that is disposed at a vehicle longitudinal direction front side and at which a first joined portion that is joined to the radiator support and a second joined portion that is joined to the lower member are formed, a rear side connecting portion that is disposed in a vehicle longitudinal direction rear side and at which the first joined portion and the second joined portion are formed, and an outer side cut-out portion that is cut out from a vehicle transverse direction outer side and that is formed at a position that, in the vehicle longitudinal direction, is between the second joined portions of both the front side connecting portion and the rear side connecting portion.

In the vehicle front portion structure of the first aspect, at the time of an offset collision of the vehicle, even if load from the vehicle front side is transmitted to the lower member in a direction that is inclined with respect to the vehicle longitudinal direction, because the lower member and the radiator support are connected by the connecting member via the first joined portions and the second joined portions, load can be transmitted from the lower member to the radiator support via the connecting member. Namely, because displacement of the lower member in the vehicle transverse direction is restricted, sideways toppling of the lower member can be suppressed.

Further, when load from the vehicle front side is transmitted from the lower member to the sub-frame, reaction force from the sub-frame is obtained, and load in the compressing direction is applied to the lower member. At this time, due to the outer side cut-out portion, a space that extends in the vehicle longitudinal direction is formed at the vehicle transverse direction inner side of the lower member, at a position that is, in the vehicle longitudinal direction, between the second joined portions of both the front side connecting portion and the rear side connecting portion of the connecting member. Therefore, at positions between the second joined portions of both the front side connecting portion and the rear side connecting portion, the strength of the connecting member with respect to load in the vehicle longitudinal direction is lowered, and the lower member being reinforced by the connecting member at the vehicle transverse direction inner side of the lower member can be suppressed. Accordingly, at the time of a front collision of the vehicle, the lower member can be axially compressed stably, and the deformation mode of the lower member is stable.

A second aspect is the vehicle front portion structure of the first aspect, wherein a joining strength of the second joined portions is lower than a joining strength of the first joined portions.

In the vehicle front portion structure of the second aspect, by setting the joining strength of the second joined portions to be lower than the joining strength of the first joined portions, the joining of the lower member and the connecting member can be made to be easy to cancel at the time of a front collision, and the lower member can be axially compressed stably at the time of a front collision. Accordingly, the deformation mode of the lower member is stable.

A third aspect is the vehicle front portion structure of the first or the second aspect, wherein positions of the second joined portions in the vehicle longitudinal direction, and positions of the first joined portions in the vehicle longitudinal direction, coincide.

In the vehicle front portion structure of the third aspect, the positions of the first joined portions in the vehicle longitudinal direction, and the positions of the second joined portions in the vehicle longitudinal direction, coincide. Due thereto, torsional load arising at the connecting member with respect to load in the vehicle transverse direction can be suppressed. Accordingly, the strength of the connecting member with respect to load in the vehicle transverse direction is increased, load can be effectively transmitted from the lower member to the radiator support, and sideways toppling of the lower member can be suppressed.

A fourth aspect is the vehicle front portion structure of the first to the third aspects, wherein: the radiator support includes a radiator support lower that extends in a vehicle transverse direction and structures a lower portion of the radiator support, and the first joined portions connect the lower member with the radiator support lower.

In the vehicle front portion structure of the fourth aspect, because the lower member and the radiator support lower are connected by the connecting member, at the time of an offset collision of the vehicle, load in the vehicle transverse direction can be transmitted from the lower member to the radiator support lower via the connecting member. Namely, load can be transmitted in the compressing direction with respect to live extending direction of the radiator support lower, and reaction force can be obtained effectively from the radiator support lower. Accordingly, sideways toppling of the lower member can be suppressed.

A fifth aspect is the vehicle front portion structure of the fourth aspect, wherein the connecting member has a side wall portion at which the second joined portions are formed and that extends in a vehicle vertical direction and the vehicle longitudinal direction, and a lower wall portion at which the first joined portions are formed and that extends in a vehicle transverse direction and the vehicle longitudinal direction and that, together with the side wall portion, forms a ridgeline that contacts the lower member.

In the vehicle front portion structure of the fifth aspect, due to the connecting member having the side wall portion and the lower wall portion that, together with the side wall portion, forms a ridgeline that contacts the lower member, the efficiency of transmitting load that is in the vehicle transverse direction from the lower member to the connecting member can be increased. Accordingly, load in the vehicle transverse direction can be transmitted from the lower member to the radiator support via the side wall portion and the lower wall portion of the connecting member, and sideways toppling of the lower member can be suppressed.

A sixth aspect is the vehicle front portion structure of the fifth aspect, wherein the connecting member has lateral wall portions that extend in the vehicle transverse direction and the vehicle vertical direction and that connect the side wall portion with the lower wall portion.

In the vehicle front portion structure of the sixth aspect, due to the connecting member having the lateral wall portions that connect the side wall portion and the lower wall portion of the connecting member, the rigidity of the connecting member with respect to load in the vehicle transverse direction can be increased. Accordingly, load in the vehicle transverse direction can be transmitted effectively from the lower member to the radiator support via the side wall portion, the lateral wall portions and the lower wall portion of the connecting member, and sideways toppling of the lower member can be suppressed.

A seventh aspect is the vehicle front portion structure of any one of the first to the sixth aspects, wherein the connecting member has a uniting portion having a dimension in the vehicle transverse direction or the vehicle vertical direction that is smaller than corresponding dimensions of the front side connecting portion and the rear side connecting portion, and that unites the front side connecting portion with the rear side connecting portion in the vehicle longitudinal direction.

In the vehicle front portion structure of the seventh aspect, due to the front side connecting portion and the rear side connecting portion being united together, in the process of joining the connecting member to the lower member, rotation of the front side connecting portion and the rear side connecting portion can be suppressed. Accordingly, the accuracy of mounting the connecting member to the lower member can be improved.

A eighth aspect is the vehicle front portion structure of the fifth or the sixth aspect, wherein the connecting member has a uniting portion having a dimension in the vehicle transverse direction or the vehicle vertical direction that is smaller than corresponding dimensions of the front side connecting portion and the rear side connecting portion, and that unites the front side connecting portion and the rear side connecting portion in the vehicle longitudinal direction, and at least a portion of the ridgeline formed by the side wall portion and the lower wall portion is cut out by the outer side cut-out portion.

In the vehicle front portion structure of the eighth aspect, at least a portion of the ridgeline, which is formed by the side wall portion and the lower wall portion, at the connecting member is cut-out. Therefore, the strength of the connecting member in the vehicle longitudinal direction can be lowered. Accordingly, at the time of a front collision of the vehicle, the lower member can be axially compressed stably; and the deformation mode of the lower member is stable.

A ninth aspect is the vehicle front portion structure of any one of the fifth to the seventh aspects, wherein the connecting member has a uniting portion having a dimension in the vehicle transverse direction or the vehicle vertical direction that is smaller than corresponding dimensions of the front side connecting portion and the rear side connecting portion, and that unites the front side connecting portion and the rear side connecting portion in the vehicle longitudinal direction, and at least a portion of the side wall portion is cut out by the outer side cut-out portion of the connecting member.

In the vehicle front portion structure of the ninth aspect, because at least a portion of the side wall portion at the connecting member is cut-out, the strength of the connecting member in the vehicle longitudinal direction can be lowered. Accordingly, at the time of a front collision of the vehicle, the lower member can be axially compressed stably, and the deformation mode of the lower member is stable.

A tenth aspect is the vehicle front portion structure of any one of the sixth, the eighth or the ninth aspects, wherein the connecting member has a uniting portion that unites the front side connecting portion and the rear side connecting portion in the vehicle longitudinal direction, and an inner side cut-out portion that is cut out from a vehicle transverse direction inner side of the lower wall portion arid that is formed at a position that is, in the vehicle longitudinal direction, between the first joined portions of both the front side connecting portion and the rear side connecting portion.

In the vehicle front portion structure of the tenth aspect, because the connecting member has the inner side cut-out portion at the vehicle transverse direction inner side of the lower wall portion, the strength of the connecting member in the vehicle longitudinal direction can be lowered. Accordingly, at the time of a front collision of the vehicle, the lower member can be axially compressed stably; and the deformation mode of the lower member is stable.

A eleventh aspect is the vehicle front portion structure of any one of the first to the sixth aspects, wherein the front side connecting portion and the rear side connecting portion are separate members that are spaced apart in the vehicle longitudinal direction by the outer side cut-out portion.

In the vehicle front portion structure of the eleventh aspect, the front side connecting portion and the rear side connecting portion are separate members that are apart in the vehicle longitudinal direction by the outer side cut-out portion. Therefore, direct transmission of load being carried out between the front side connecting portion and the rear side connecting portion can be suppressed. Accordingly, at the time of a front collision of the vehicle, the lower member can be axially compressed stably, and the deformation mode of the lower member is stable.

A twelfth aspect is the vehicle front portion structure of any one of the first aspect to the eleventh aspects, wherein the lower member is an extrusion-molded part having a cross-section orthogonal to an extending direction that has a closed cross-sectional shape.

In the vehicle front portion structure of the twelfth aspect, the lower member is an extrusion-molded part whose cross-section orthogonal to the extending direction is a closed cross-sectional shape. Therefore, as compared with a case in which the lower member is structured due to an inner panel and an outer panel being joined at flange portions that extend in the vehicle longitudinal direction, the lower member can be axially compressed stably at the time of a front collision of the vehicle. Accordingly, the deformation mode of the lower member is stable.

A thirteenth aspect is the vehicle front portion structure of any one of the first to the twelfth aspects, wherein: a cross-section, orthogonal to an extending direction, of the lower member has a rectangular shape, and the lower member has ridgelines in the extending direction, and has a weak portion that is weakened due to the ridgelines of the lower member being cut out by beads, and the weak portion is provided at a position that, in the vehicle longitudinal direction, is between a position at which the front side connecting portion is joined to the lower member and a position at which the rear side connecting portion is joined to the lower member.

In the vehicle front portion structure of the thirteenth aspect, the weak portion of the lower member is provided at a position that, in the vehicle longitudinal direction, is between the second joined portion of the front side connecting portion and the second joined portion of the rear side connecting portion in the vehicle longitudinal direction. Due thereto, as compared with a case in which, for example, the weak portion is provided at the position of the second joined portion of the front side connecting portion in the vehicle longitudinal direction, at the time of an offset collision of the vehicle, load can be transmitted stably from the lower member to the radiator support via the connecting member. Accordingly, sideways toppling of the lower member can be suppressed.

A fourteenth aspect is the vehicle front portion structure of the thirteenth aspect, wherein the weak portion is provided at a region that is at a vehicle longitudinal direction front side of the lower member, and the region that is at the vehicle longitudinal direction front side of the lower member is weakened as compared with a region that is at a vehicle longitudinal direction rear side.

In the vehicle front portion structure of the fourteenth aspect, the strength of the rear side region of the lower member is relatively high as compared with that of the front side region, and sideways toppling of the lower member at the time of an offset collision can be suppressed.

A fifteenth aspect of a vehicle front portion structure, includes: a sub-frame that structures a portion of a suspension, and that is disposed at a vehicle vertical direction lower side of front side members that extend in a vehicle longitudinal direction at both vehicle transverse direction outer sides of a vehicle front portion; lower members that extend toward a vehicle front side from a front end portion of the sub-frame; a radiator support that is disposed at a vehicle transverse direction inner side of the front side members, and that is formed in a shape of a rectangular frame in a vehicle front view; and connecting members that each have a first joined portion that is joined to the radiator support, and a second joined portion that is joined to the lower member and has a lower joining strength than a joining strength of the first joined portions.

In the vehicle front portion structure of the fifteenth aspect, because the lower member and the radiator support are connected by the connecting member, at the time of an offset collision of the vehicle, load can be transmitted from the lower member to the radiator support via the connecting member. Accordingly, sideways toppling of the lower member can be suppressed.

Further, due to the joining strength of the second joined portions being made to be lower than the joining strength of the first joined portions, at the time of a front collision, the joining of the lower member and the connecting member is easy to cancel, and the lower member can be axially compressed stably at the time of a front collision. Accordingly, the deformation mode of the lower member is stable.

As described above, the vehicle front portion structure of the present disclosure can achieve both suppression of sideways toppling of the lower member at the time of an offset collision of the vehicle, and stabilization of the deformation mode of the lower members at the time of a front collision of the vehicle.

What is claimed is:

1. A vehicle front portion structure, comprising:
a sub-frame that structures a portion of a suspension, and that is disposed at a vehicle vertical direction lower side of front side members that extend in a vehicle longitudinal direction at both vehicle transverse direction outer sides of a vehicle front portion;
lower members that extend toward a vehicle front side from a front end portion of the sub-frame;
a radiator support that is disposed at a vehicle transverse direction inner side of the front side members, and that is formed in a shape of a rectangular frame in a vehicle front view; and
connecting members that each have a front side connecting portion that is disposed at a vehicle longitudinal direction front side and at which a first joined portion that is joined to the radiator support and a second joined portion that is joined to the lower member are formed, a rear side connecting portion that is disposed at a vehicle longitudinal direction rear side and at which the first joined portion and the second joined portion are formed, and an outer side cut-out portion that is cut out from a vehicle transverse direction outer side and that is formed at a position that, in the vehicle longitudinal direction, is between the second joined portions of both the front side connecting portion and the rear side connecting portion.

2. The vehicle front portion structure of claim 1, wherein a joining strength of the second joined portions is lower than a joining strength of the first joined portions.

3. The vehicle front portion structure of claim 1, wherein positions of the second joined portions in the vehicle longitudinal direction, and positions of the first joined portions in the vehicle longitudinal direction, coincide.

4. The vehicle front portion structure of claim 1, wherein:
the radiator support includes a radiator support lower that extends in a vehicle transverse direction and structures a lower portion of the radiator support, and
the first joined portions connect the lower member with the radiator support lower.

5. The vehicle front portion structure of claim 1, wherein:
the radiator support includes a radiator support lower that extends in a vehicle transverse direction and structures a lower portion of the radiator support, a radiator support upper, and radiator support sides that vertically connect both left and right end portions of the radiator support upper and the radiator support lower and that structure vehicle transverse direction side portions of the radiator support, and
the first joined portions connect the lower member with the radiator support side.

6. The vehicle front portion structure of claim 4, wherein the connecting member has a side wall portion at which the second joined portions are formed and that extends in a vehicle vertical direction and the vehicle longitudinal direction, and a lower wall portion at which the first joined portions are formed and that extends in a vehicle transverse direction and the vehicle longitudinal direction and that, together with the side wall portion, forms a ridgeline that contacts the lower member.

7. The vehicle front portion structure of claim 6, wherein the connecting member has lateral wall portions that extend in the vehicle transverse direction and the vehicle vertical direction and that connect the side wall portion with the lower wall portion.

8. The vehicle front portion structure of claim 1, wherein the connecting member has a uniting portion having a dimension in the vehicle transverse direction or the vehicle vertical direction that is smaller than corresponding dimensions of the from side connecting portion and the real side connecting portion, and that unites the front side connecting portion with the rear side connecting portion in the vehicle longitudinal direction.

9. The vehicle front portion structure of claim 6, wherein the connecting member has a uniting portion having a dimension in the vehicle transverse direction or the vehicle vertical direction that is smaller than corresponding dimensions of the front side connecting portion and the rear side connecting portion, and that unites the front side connecting portion and the rear side connecting portion in the vehicle longitudinal direction, and at least a portion of the ridgeline formed by the side wall portion and the lower wall portion is cut out by the outer side cut-out portion.

10. The vehicle front portion structure of claim 6, wherein the connecting member has a uniting portion having a dimension in the vehicle transverse direction or the vehicle vertical direction that is smaller than corresponding dimensions of the front side connecting portion and the rear side connecting portion, and that unites the front side connecting portion and the rear side connecting portion in the vehicle longitudinal direction, and at least a portion of the side wall portion is cut out by the outer side cut-out portion of the connecting member.

11. The vehicle front portion structure of claim 5, wherein the connecting member has a uniting portion that unites the front side connecting portion and the rear side connecting portion in the vehicle longitudinal direction, and an inner side cut-out portion that is cut out from a vehicle transverse direction inner side of the lower wall portion and that is formed at a position that is, in the vehicle longitudinal direction, between the first joined portions of both the front side connecting portion and the rear side connecting portion.

12. The vehicle front portion structure of claim 1, wherein the front side connecting portion and the rear side connecting portion are separate members that are spaced apart in the vehicle longitudinal direction by the outer side cut-out portion.

13. The vehicle front portion structure of claim 1, wherein the lower member is an extrusion-molded part having a cross-section orthogonal to an extending direction that has a closed cross-sectional shape.

14. The vehicle front portion structure of claim 1, wherein:
- a cross-section, orthogonal to an extending direction, of the lower member has a rectangular shape, and the lower member has ridgelines in the extending direction, and has a weak portion that is weakened due to the ridgelines of the lower member being cut out by beads, and
- the weak portion is provided at a position that, in the vehicle longitudinal direction, is between a position at which the front side connecting portion is joined to the lower member and a position at which the rear side connecting portion is joined to the lower member.

15. The vehicle front portion structure of claim 14, wherein the weak portion is provided at a region that is at a vehicle longitudinal direction front side of the lower member, and the region that is at the vehicle longitudinal direction front side of the lower member is weakened as compared with a region that is at a vehicle longitudinal direction rear side.

16. A vehicle front portion structure, comprising:
- a sub-frame that structures a portion of a suspension, and that is disposed at a vehicle vertical direction lower side of front side members that extend in a vehicle longitudinal direction at both vehicle transverse direction outer sides of a vehicle front portion;
- lower members that extend toward a vehicle front side from a front end portion of the sub-frame;
- a radiator support that is disposed at a vehicle transverse direction inner side of the front side members, and that is formed in a shape of a rectangular frame in a vehicle front view; and
- connecting members that each have a first joined portion that is joined to the radiator support, and a second joined portion that is joined to the lower member and has a lower joining strength than a joining strength of the first joined portions.

* * * * *